No. 738,901. PATENTED SEPT. 15, 1903.
O. O. GOODENOW.
DISK SHARPENING MACHINE.
APPLICATION FILED JUNE 22, 1903.
NO MODEL. 2 SHEETS—SHEET 1.

Witnesses
J. Koehl,

Inventor
O. O. Goodenow,
By H. R. Wilson,
Attorney

No. 738,901. PATENTED SEPT. 15, 1903.
O. O. GOODENOW.
DISK SHARPENING MACHINE.
APPLICATION FILED JUNE 22, 1903.
NO MODEL. 2 SHEETS—SHEET 2.
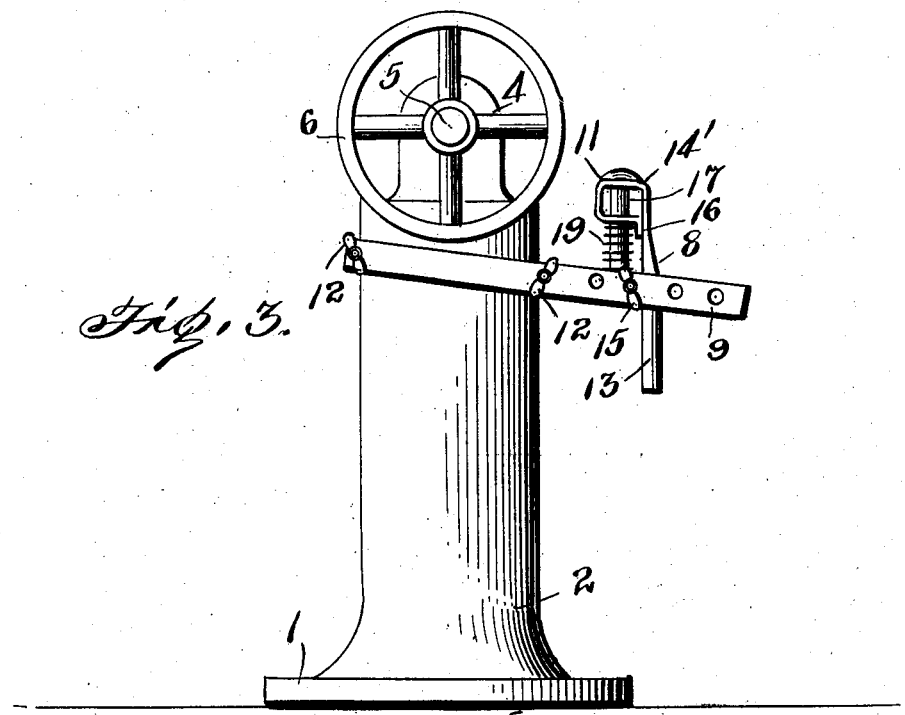
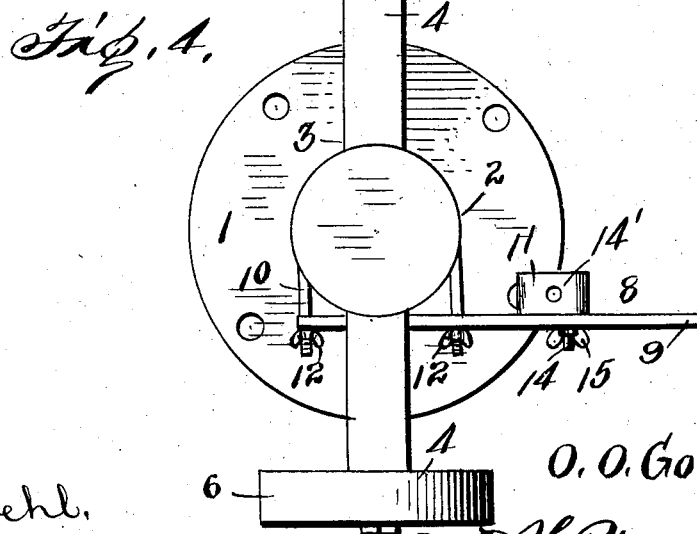
Witnesses
Jas Koehl.
Inventor
O. O. Goodenow,
By H. B. Wilson,
Attorney No. 738,901.

Patented September 15, 1903.

UNITED STATES PATENT OFFICE.

ORVILLE O. GOODENOW, OF PORTIS, KANSAS.

DISK-SHARPENING MACHINE.

SPECIFICATION forming part of Letters Patent No. 738,901, dated September 15, 1903.

Application filed June 22, 1903. Serial No. 162,650. (No model.)

*To all whom it may concern:*

Be it known that I, ORVILLE O. GOODENOW, a citizen of the United States, residing at Portis, in the county of Osborne and State of Kansas, have invented certain new and useful Improvements in Disk-Sharpening Machines; and I do declare the following to be a full, clear, and exact description of the invention, such as will enable others skilled in the art to which it appertains to make and use the same.

This invention relates to improvements in disk-sharpening machines.

The object of the invention is to provide a machine of this character with which disks of harrows and other agricultural machines may be sharpened.

Another object is to provide a device of this character which may be adjusted to accommodate various sizes of disks and to secure any desired bevel on the edge of the disk.

A further object is to provide a disk-holder whereby the disk will be permitted to slowly turn while being ground to prevent heating, drawing of the temper, or warping of the disk in any way, a tension device being also provided for regulating the pressure or feed of the disk against the stone.

With these and other objects in view the invention consists of certain novel features of construction, combination, and arrangement of parts, as will be more fully described, and particularly pointed out in the appended claims.

Figure 1:
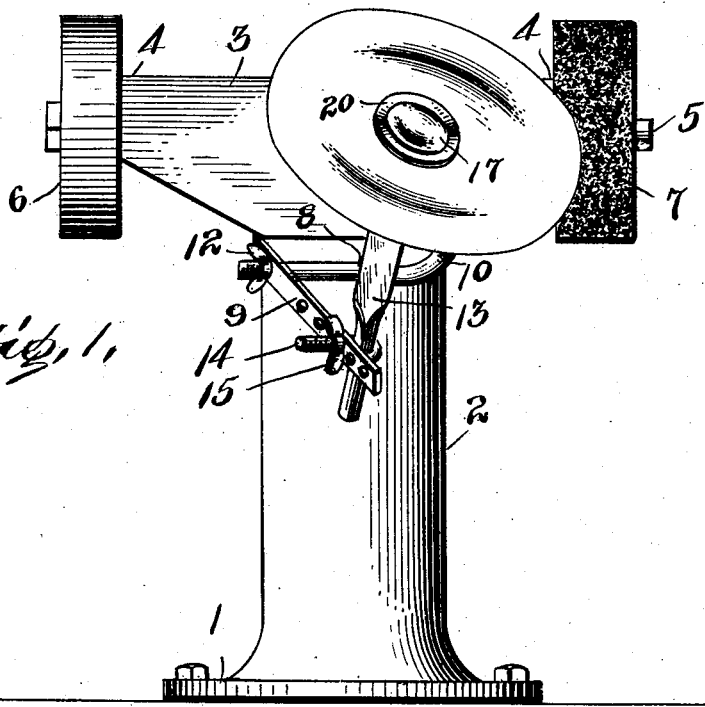
Figure 2:
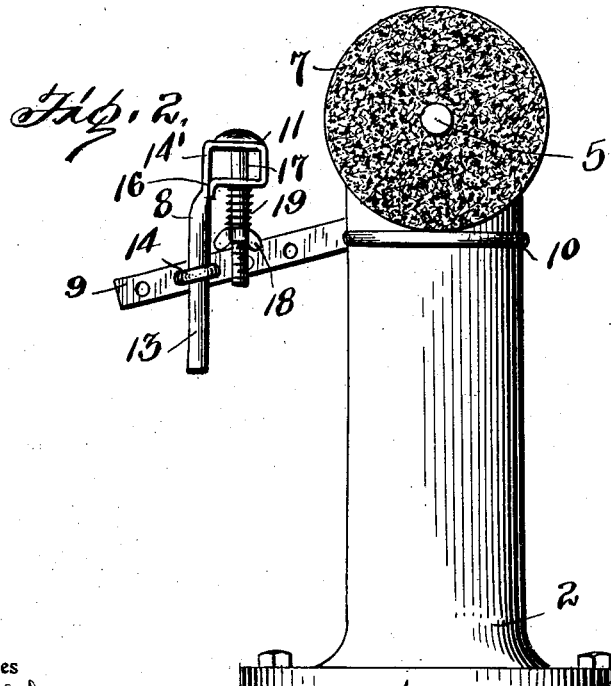

In the drawings, Figure 1 is a side view of the machine, showing the operation of the same. Fig. 2 is an elevation of one end of the machine. Fig. 3 is a similar view of the opposite end, and Fig. 4 is a top plan view.

Referring more particularly to the drawings, 1 denotes a base having an upwardly-projecting standard 2 formed on its upper end, with a head 3, on which are formed journaled bearings 4, in which are journaled a shaft 5, having on one end a belt wheel or pulley 6 and on the opposite end an emery-wheel 7.

8 denotes a disk-holder-supporting bracket, consisting of a bar 9, connected at one end with the standard 2 by a yoke or band 10, the threaded ends of which project through holes in the bar 9 and receive nuts 12, by which the yoke and bar may be clamped to the standard at any desired level.

The disk-holder consists of an arm 13, connected at its lower end with the bar 9 by means of a hook-bolt 14, which passes through one of a series of holes formed in the outer end of the bar 9 and is adapted to receive a clamping-nut 15, which when screwed up against the bar 9 will securely hold the arm 13 in any adjusted position. On the upper end of the arm 13 is formed a seat 14, this seat being formed by flattening the upper end 11 of the arm and bending it outwardly, then downwardly and inwardly against itself, as shown at 16. Vertically-disposed alined openings are formed in the laterally-bent portion of the arm 13, through which passes a holding rod or bolt 17, formed on its upper end with a head and threaded on its lower end for the reception of a thumb-nut 18. Between the nut 18 and the portion 16 of the arm is arranged a coiled spring 19, through which passes the rod or bolt 17.

In operation a disk is placed upon the top of the arm 13 and the bolt 17 passed through the central aperture in the same and through the alined holes in the laterally-bent portions of the arm and through the spring 19, as hereinbefore described. A cone-shaped plate 20 is arranged on the upper end of the rod or bolt 17 between the head of the same and the disk. The nut 18 is now screwed upon the lower end of the bolt and against the spring 19, thereby yieldingly holding the disk upon the upper end of the arm 13 and against the periphery of the emery-wheel 7, the pressure of the disk upon the emery-wheel being regulated by tightening or loosening the nut 18 to increase or diminish the tension of the spring, as will be understood.

Disks of different sizes may be supported in position for grinding by shifting the position of the bar 9, while a greater or less bevel may be given to the edge of the disk by turning the hooked clamping-bolt 14.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim, and desire to secure by Letters Patent, is—

1. In a disk-sharpening machine, the combination with a suitable supporting-standard having mounted thereon an emery-wheel, of a bracket adjustably secured to said standard a disk-holding arm adjustably mounted on said bracket and means for yieldingly supporting a disk on said arm in position to engage said emery-wheel, substantially as described.

2. In a disk-sharpening machine, the combination with a suitable supporting-standard having mounted thereon a shaft carrying an emery-wheel and a drive-pulley, of a bracket adjustably secured to said standard, and comprising a laterally-projecting bar one end of which is secured to said standard by a yoke, and in the opposite end of which is formed bolt-holes, a disk-holding arm adjustably mounted on this end of said bar, means for adjustably and pivotally securing said arm to the bar, and means for yieldingly supporting or holding a disk upon said arm in position to engage said emery-wheel, substantially as described.

3. In a disk-sharpening machine, the combination with a suitable supporting-standard having mounted thereon a shaft carrying an emery-wheel and a drive-pulley, of a bracket adjustably secured to said standard, and comprising a laterally-projecting bar one end of which is secured to said standard by a yoke, and in the opposite end of which is formed bolt-holes, a disk-holding arm adjustably mounted on this end of said bar, a hook-bolt, one end of which passes through one of said bolt-holes and receives a clamping-nut and the hooked end of which is adapted to engage the lower end of said arm to clamp the same to said bar, a bolt passing through the laterally-bent upper end of said arm and adapted to hold a disk in position upon the same, a coiled spring arranged on the lower end of said bolt, an adjusting-nut screwed upon said end against said spring whereby the tension of the same may be regulated and a cone-shaped washer interposed between the head of said bolt and the face of said disk, substantially as described.

In testimony whereof I have hereunto set my hand in presence of two subscribing witnesses.

ORVILLE O. GOODENOW.

Witnesses:
GEO. C. BRUMBAUGH,
CLARA M. PAXTON.